(12) United States Patent
Darde et al.

(10) Patent No.: US 9,028,794 B2
(45) Date of Patent: May 12, 2015

(54) METHOD FOR PRODUCING HYDROGEN WITH REDUCED $CO_2$ EMISSIONS

(75) Inventors: Arthur Darde, Paris (FR); Solène Valentin, Meudon (FR); Philippe Court, Vincennes (FR); Jean-Pierre Tranier, L'Hay-les-Roses (FR); Xavier Traversac, Paris (FR); Paul Terrien, Baltimore, MD (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/637,423

(22) PCT Filed: Mar. 16, 2011

(86) PCT No.: PCT/FR2011/050532
§ 371 (c)(1),
(2), (4) Date: Sep. 26, 2012

(87) PCT Pub. No.: WO2011/124797
PCT Pub. Date: Oct. 13, 2011

(65) Prior Publication Data
US 2013/0017146 A1    Jan. 17, 2013

(30) Foreign Application Priority Data
Mar. 30, 2010   (FR) ..................... 10 52341

(51) Int. Cl.
*C01B 3/02*  (2006.01)
*C01B 3/38*  (2006.01)
(Continued)

(52) U.S. Cl.
CPC ... *C01B 3/38* (2013.01); *C01B 3/48* (2013.01);
*C01B 3/56* (2013.01); *C01B 2203/0233*
(2013.01); *C01B 2203/0288* (2013.01); *C01B*
*2203/043* (2013.01); *C01B 2203/046* (2013.01);
(Continued)

(58) Field of Classification Search
None
See application file for complete search history.

(56) References Cited

U.S. PATENT DOCUMENTS 8,021,464 B2    9/2011  Gauthier et al.
2008/0179569 A1  7/2008  Clomburg et al.
(Continued)

FOREIGN PATENT DOCUMENTS

EP         0341879        11/1989
WO       WO2006054008     5/2006

OTHER PUBLICATIONS

Hiller, H. et al., "Gas Production," Ullmann's Encyclopedia of Industrial Chemistry, Dec. 15, 2006, pp. 1-2, 77-82, 161-162.
(Continued)

*Primary Examiner* — Melvin C Mayes
*Assistant Examiner* — Douglas Call
(74) *Attorney, Agent, or Firm* — Justin K. Murray (57) ABSTRACT

The present invention relates to a method for producing hydrogen, with reduced carbon dioxide emissions, from a hydrocarbon mixture. In said method, the hydrocarbon mixture is reformed so as to produce a synthetic gas that is cooled, then treated in a shift reactor so as to be enriched with H2 and CO2. Optionally dried, said mixture is treated in a PSA hydrogen purification unit in order to produce hydrogen. The residue is treated by means of partial condensation with a view to capturing CO4 before said residue is sent as fuel to reforming.

13 Claims, 3 Drawing Sheets

(51) Int. Cl.
*C01B 3/48* (2006.01)
*C01B 3/56* (2006.01)

(52) U.S. Cl.
CPC ... *C01B 2203/047* (2013.01); *C01B 2203/0475* (2013.01); *C01B 2203/0495* (2013.01); *Y02C 10/04* (2013.01)

(56) References Cited

U.S. PATENT DOCUMENTS

2009/0117024 A1 5/2009 Weedon et al.
2011/0229405 A1* 9/2011 Guo et al. .................. 423/648.1

OTHER PUBLICATIONS

FR1052341, French Search Report, Nov. 19, 2010.

PCT/FR2011/050532, International Search Report, Jul. 18, 2011.
Cromarty, B.J., et al., "Increasing the Throughput of an Existing Hydrogen Plant," International Journal of Hydrogen Energy, Elsevier Science Publishers B.V., vol. 22, No. 1, Jan. 1, 1997, pp. 17-22.

* cited by examiner

METHOD FOR PRODUCING HYDROGEN WITH REDUCED $CO_2$ EMISSIONS

CROSS-REFERENCE TO RELATED APPLICATIONS

This application is a §371 of International PCT Application PCT/FR2011/050532, filed Mar. 16, 2011, which claims §119(a) foreign priority to French patent application 1052341, filed Mar. 30, 2010.

FIELD OF THE INVENTION

The present invention relates to a process for the production of hydrogen in combination with capture of $CO_2$, in which the mixture of hydrocarbons is reformed to produce a synthesis gas which is cooled, then enriched in $H_2$ and $CO_2$, optionally dried, and treated in a PSA hydrogen purification unit to produce hydrogen, the waste product being treated with a view to capturing $CO_2$; it also relates to a plant suitable for carrying out the process.

Climate change is one of the major current environmental problems; the increase in the concentration of greenhouse gases in the atmosphere, in particular of carbon dioxide, is an essential cause of this. Reducing the emissions of greenhouse gases, and very particularly reducing $CO_2$ emissions, is one of the major challenges facing mankind.

$CO_2$ of human origin originates from various sources; each type of emission has to be reduced. One of the essential emissions is, however, that which results from the combustion of fuels, very particularly fossil fuels.

The European Community is committed to achieving a reduction of 8% in its emissions of greenhouse gases between 2008 and 2012, compared with the 1990 level. To help in achieving this result, a market for the emissions of greenhouse gases (ETS, Emission Trading System) has been established. Thus industrial sites have to buy quotas corresponding to their emissions of greenhouse gases and particularly of carbon dioxide.

Units producing hydrogen and carbon monoxide emit carbon dioxide by the combustion of carbon-based fuels. The $CO_2$ present in the flue gases thus originates from the combustion of gases, not of economic value, generated in the process and recycled in the form of fuels, and of additional fuels, such as naphtha and natural gas.

If they are not yet affected, sites for the production of $H_2$/CO will be included in the ETS from 2013.

Furthermore, many other countries, such as Canada and the United States, also intend to institute a $CO_2$ emissions quota market.

Thus, because they will soon be subjected to this constraint, these sites and in particular sites for the production of hydrogen must now develop solutions for capturing $CO_2$ of high efficiency.

A portion of the $CO_2$ emitted in the flue gases originates from the combustion of carbon-based fuels recycled from the process; the gases, not of economic value, sent for combustion comprise, in variable proportions, methane, carbon dioxide, nitrogen and also hydrogen.

In order to reduce emissions of $CO_2$ by the flue gases, one solution consists in treating the flue gases in order to capture the $CO_2$ downstream of combustion; a second solution consists in reducing the contribution of $CO_2$ originating from the recycled gases.

It is this second solution which the invention is targeted at improving. This is because the first solution treats flue gases where the $CO_2$ is diluted in the nitrogen of the combustion air, which makes it more expensive to separate the $CO_2$.

SUMMARY OF THE INVENTION

The purpose of the present invention is to reduce the contribution of $CO_2$-generating entities originating from the recycled gases, while maintaining the effectiveness of the combustion. It concerns not only reducing the contribution of $CO_2$ but also reducing the contribution of entities which generate $CO_2$ by combustion (mainly CO and $CH_4$).

The invention is of particular use in the specific case of the production of hydrogen.

When it is desired to produce hydrogen from a gas rich in hydrogen—typically a synthesis gas enriched in hydrogen by a high-temperature shift reaction (HT shift) in the presence of steam (according to the reaction $CO+H_2O \rightarrow CO_2+H_2$)—, the process used for the separation and the purification of the hydrogen is the pressure swing adsorption (PSA) process. This process makes it possible to generate a stream of pure hydrogen—with a purity generally of greater than 99% by volume—and a waste gas depleted in hydrogen which concentrates the other entities present in the starting mixture to be purified, including $CO_2$.

A solution currently used to capture the $CO_2$ present in the process gas consists in recovering it with regard to the waste product from the unit for the purification of the hydrogen, via a compression and purification unit (CPU)—thus before the combustion which dilutes the $CO_2$ in the nitrogen of the combustion air—. This solution is described in particular in the document WO 2006/054008.

A process for the production of hydrogen has to incorporate a process for capturing $CO_2$, exhibiting a high $CO_2$ capture efficiency.

An objective of the invention is thus—in order to reduce the emissions of $CO_2$ in the flue gases—to convert entities which generate $CO_2$ into $CO_2$ not during the combustion but upstream of the recycling, making it possible for the additional $CO_2$ thus produced to be captured specifically or with the preexisting $CO_2$.

The carbon dioxide is recovered by treatment of the waste product from the unit for the purification of the hydrogen (pressure swing adsorption unit—PSA $H_2$). This treatment is carried out in a compression and purification unit (CPU) by cooling the waste product from the PSA until it partially condenses and a liquid rich in carbon dioxide and a new gaseous waste product, comprising the noncondensable compounds resulting from the treatment by the CPU, are obtained.

Until now, attention has been directed at the treatment of the PSA waste product for the purpose of capturing a significant portion of the $CO_2$ present in the synthesis gas and of thus limiting the emissions of $CO_2$ in the combustion flue gases; the fact nevertheless remains that the recycling of the waste gases from this capturing treatment—which capturing is generally carried out in a compression and purification unit (CPU)—is capable of also generating an even greater amount of $CO_2$ in the combustion flue gases, this $CO_2$ originating from carbon-based molecules other than $CO_2$ but which can produce $CO_2$ (essentially CO and $CH_4$).

In order to improve the efficiency of capture of the $CO_2$, it is known to treat the noncondensable gases resulting from the CPU by membrane permeation, the aim being to obtain a stream rich in methane in order to recycle a portion thereof in the combustion region of the furnace and a portion in the reforming region.

It is this which is described in the document WO 2006/054008, which teaches a process for the production of hydrogen and for the production of carbon dioxide in combination starting from a synthesis gas obtained by reforming natural gas in which a fluid enriched in carbon dioxide is recovered by treatment of the waste product from the PSA $H_2$ unit, this treatment making it possible to obtain at least one liquid or supercritical stream rich in $CO_2$ and a second gas stream rich in $H_2$ and comprising most of the remaining $CO_2$; this document additionally discloses treating this second stream in a permeation unit in order to produce two streams, the first of which, which is rich in $H_2$ and $CO_2$, will be recycled in the charge feeding the PSA, while the second, which comprises CO, $CH_4$, $N_2$, and the like, is sent to the reforming furnace, including the combustion of the flue gases part and the conversion of methane to hydrogen part.

However, with this solution, the methane and the carbon monoxide present in the second stream resulting from the treatment of the waste product from the PSA are still introduced into the burners and thus generate $CO_2$ by combustion, which is thus still discharged to the atmosphere.

In order to limit the emissions of $CO_2$, the aim of the invention is to limit the contribution—at the burners—of entities which emit $CO_2$ by combustion ($CH_4$, CO and $CO_2$) and very particularly to eliminate, from the recycling, the entities exhibiting the poorest intrinsic calorific value/carbon dioxide emitted ratio. As is shown in the table below, the entities to be removed from the recycling as fuel are thus, first, carbon dioxide itself, the intrinsic calorific value of which is zero, but also carbon monoxide, the intrinsic calorific value of which is three times lower than that of methane, the most advantageous entity for combustion without emission of $CO_2$ being, very naturally, hydrogen.

| Entities | $H_2$ | $CH_4$ | CO | $CO_2$ |
|---|---|---|---|---|
| kcal/$Sm^3$ $CO_2$ generated | $\infty$ (infinite) | 8550 | 3020 | 0 |

For this, the solution of the invention consists in combining individual operations for conversions and/or separations of entities, applied to carefully chosen streams, with the aim of optimizing the capture of $CO_2$ and thereby of significantly limiting the emissions of $CO_2$ generated by the partial recycling of the noncondensable waste gases from the compression and purification unit or CPU in the process for the production of hydrogen.

A subject matter of the invention is thus more particularly a process for the production of hydrogen in combination with capture of carbon dioxide starting from a mixture of hydrocarbons, comprising at least the following steps:

a step (a) of reforming the mixture of hydrocarbons in order to obtain a synthesis gas comprising at least hydrogen, carbon monoxide, carbon dioxide, methane, water vapor and impurities, a step (b) of cooling the synthesis gas with recovery of the available heat, a step (c) of a shift reaction on all or part of the cooled synthesis gas in order to oxidize most of the carbon monoxide to give carbon dioxide with corresponding production of hydrogen, a step (d) of cooling the synthesis gas enriched in $H_2$ and $CO_2$ resulting from step (c) with separation of the condensed water, an optional step (e) of additional drying of the cooled synthesis gas in order to obtain a dry synthesis gas (with a water content of less than 200 ppm), a step (f) of separation of the constituents of the dry synthesis gas in a pressure swing adsorption (or PSA $H_2$) unit which makes it possible to obtain a high-pressure stream enriched in hydrogen and a stream Rpsa of PSA waste gas predominantly comprising carbon dioxide and hydrogen but also carbon monoxide, methane and impurities, and also steps of treatment of the stream Rpsa comprising at least:

a step (g) of compressing said waste stream Rpsa such that its pressure is between 20 and 100 bar, a step (h) of treatment of a stream X resulting—directly or indirectly—from the stream Rpsa in order to separate $CO_2$, making it possible to obtain a stream of liquid or supercritical $CO_2$ and a gaseous capture waste product Rc enriched in hydrogen and in other noncondensable constituents, a step (i) of treatment of the capture waste product Rc in order to produce at least one stream to be recycled as fuel in the reforming furnace, characterized in that the process additionally comprises, downstream of step (f), an additional step (j) of treatment of the stream Rpsa, which step (j) is situated upstream of a step of separation of $CO_2$ and which step (j) is a second shift reaction step which can be followed by removal of water, thus producing a dry gas depleted in CO and enriched in $CO_2$ and in $H_2$.

If need be, step (g) can be preceded by a step of drying the stream Rpsa in order to remove water molecules present in the waste product Rpsa and to thus obtain a waste product Rpsa which is sufficiently dry to prevent the condensation of carbonic acid in step (g).

The stream X treated in step (h) can result directly from the stream Rpsa; in this case, step (j) will be followed by an additional step of separation of the $CO_2$. The stream X can also result indirectly from the stream Rpsa, that is to say be the product of a treatment to which the stream Rpsa has been subjected—for example a step (j)—, and step (h) forms, in this case, said step of separation of the $CO_2$ as described above.

The aim of the treatment of the invention is thus to convert the carbon monoxide which was not converted during the first shift reaction of step (c), so as to remove the carbon monoxide which, without this additional treatment, would still be present in the final stream to be recycled. This conversion by a shift reaction with steam is carried out according to the reaction: $CO+H_2O \Longleftrightarrow CO_2+H_2$.

A shift reaction does not provide complete conversion, all the less so when it is carried out at high temperature; it makes possible greater conversion of the CO to $CO_2$ at moderate temperature (MT shift) and even more at low temperature (LT shift).

The shift reaction of step (c) is generally carried out at high temperature (the outlet temperature is between 250 and 480° C.) since it is applied to the synthesis gas generated at a very high temperature and specially cooled in order to carry out this reaction. There thus remains, at the outlet of step (c), a significant proportion of unreacted carbon monoxide. It is this remaining carbon monoxide which will react subsequently during step (j). The $CO_2$ thus formed is removed by separation, either alone or at the same as the $CO_2$ present at the outlet of the first shift step (c), according to the location of this additional step according to the invention. This second shift step, carried out at medium or low temperature (the outlet temperature is between 200 and 300° C.), makes it possible to remove the bulk of the CO, which would be returned as fuel to the reforming, and thus to significantly reduce the amount of $CO_2$ in the flue gases.

This additional shift step can be carried out in different locations in the process, provided that a step of separation of the $CO_2$ produced is included in the process downstream. Thus, according to preferred alternative forms:

step (j) is fed with the compressed waste product Rpsa resulting from step (g), and the shifted and optionally dried gas resulting from step (j) constitutes the stream X which feeds step (h), which step (h) constitutes in this case said step during which the $CO_2$ is separated, as described above;

step (j) is fed with the capture waste product Rc resulting from step (h), and the shifted and optionally dried gas resulting from step (j) is subsequently treated in a step (k) which separates the $CO_2$—which will be sent back to feed step (h)—and produces a gas rich in $H_2$ capable of being recycled as clean fuel; preferably, step (k) is a step of pressure swing adsorption via a PSA $CO_2$, and then the waste product rich in hydrogen resulting from said adsorption step is recycled as clean fuel in the reforming;

step (j) can be fed with the permeate enriched in hydrogen, CO and $CO_2$ from a membrane downstream of step (h), and the shifted and optionally dried gas resulting from step (j) is subsequently recycled at the inlet of step (f) of separation by pressure swing adsorption.

According to another aspect of the invention, the latter relates to a plant for production of hydrogen combined with capture of carbon dioxide starting from a mixture of hydrocarbons, comprising at least:

a module for reforming the mixture of hydrocarbons in order to obtain a synthesis gas, a first module for cooling the synthesis gas with means for recovering the available heat, a module for shifting the synthesis gas with steam, a module for cooling the shifted synthesis gas with condensation of the steam and recovery of the condensed water, an optional module for drying the shifted and cooled synthesis gas, a unit for purification by pressure swing adsorption (or PSA) of the dry synthesis gas which makes it possible to obtain hydrogen and a waste product Rpsa, and also:

a compression module capable of compressing the waste product from the PSA up to a pressure of between 20 and 100 bar, means for carrying out step (h) of treatment of a stream X resulting (directly or indirectly) from the stream Rpsa in order to separate $CO_2$, making it possible to obtain a stream of liquid or supercritical $CO_2$ and a gaseous capture waste product Rc enriched in hydrogen and in other noncondensable constituents, means for treating the capture waste product Rc in order to produce at least one stream to be recycled as fuel in the reforming furnace, and in which the plant additionally comprises, downstream of the compression module and upstream of a means for separation of the $CO_2$, a second shift module which can be followed by a module for the removal of water.

According to preferred alternative forms, the plant comprises all or some of the following means:

means for feeding the second shift module with the compressed waste product Rpsa, and means intended to feed the means for the implementation of step (h) with shifted gas resulting from the second shift module which can be followed by a module for the removal of water;

means for feeding the second shift module with the capture waste product Rc resulting from the means for the implementation of step (h), and also means for treating the shifted gas resulting from step (j) in order to separate the $CO_2$ and to produce a gas rich in $H_2$, and also means for feeding the means for the implementation of step (h) with said separated $CO_2$, and means capable of recycling said gas rich in $H_2$ as fuel; advantageously, said means for treating the shifted gas resulting from step (j) in order to separate the $CO_2$ and to produce a gas rich in $H_2$ comprise a unit for the separation of $CO_2$ by pressure swing adsorption of the PSA $CO_2$ type, membrane permeation means for treating the capture waste product Rc, means for feeding the second shift module with the permeate enriched in hydrogen, CO and $CO_2$ resulting from the membrane permeation means, and means for feeding the unit for the purification by pressure swing adsorption (or PSA) of the dry synthesis gas which makes it possible to obtain hydrogen and a waste product Rpsa with the shifted gas resulting from said second shift module which can be followed by a module for the removal of water.

BRIEF DESCRIPTION OF THE FIGURES

Other characteristics and advantages of the present invention will become apparent on reading the description below of nonlimiting implementational examples, which descriptions are made with reference to the appended figures, in which.

DETAILED DESCRIPTION OF THE INVENTION

Figure 1:
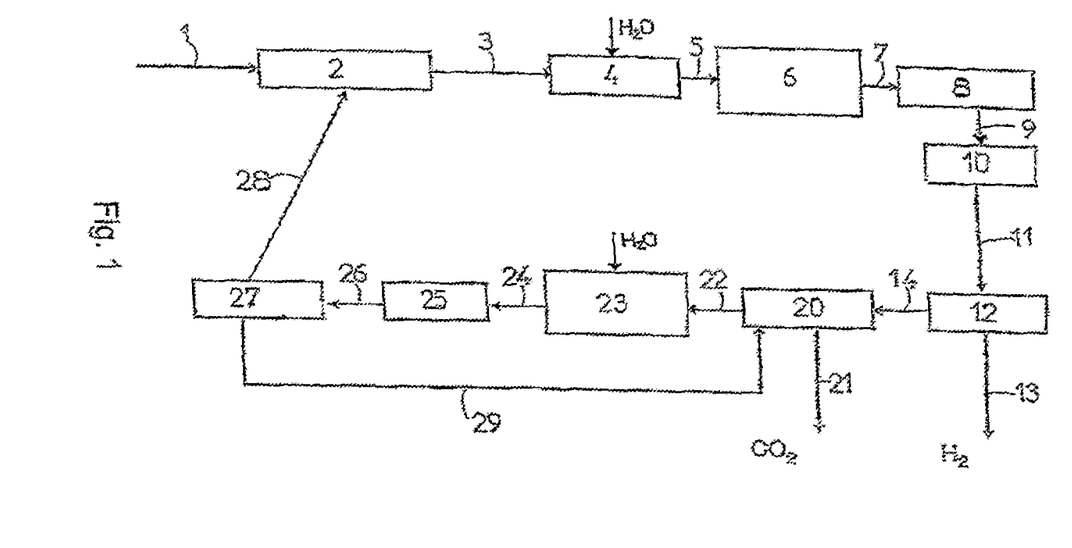
FIG. 1 is a diagrammatic view of a process for the production of hydrogen in combination with capture of carbon dioxide according to the invention, in which the (second) shift step according to the invention is carried out on the waste product resulting from the step of separation of $CO_2$ by CPU, the product from the reaction being treated by a PSA $CO_2$.

FIG. 1 thus describes a preferred embodiment of the process of the invention in which a charge of hydrocarbons 1 mixed with steam (not represented) feeds a reformer 2 in order to generate a synthesis gas 3 comprising at least methane, hydrogen, carbon monoxide and carbon dioxide. This steam reforming step is carried out in a steam reforming furnace comprising tubes filled with catalysts, the heat necessary for the reforming being contributed by combustion. The synthesis gas 3 is then cooled in 4, the cooled synthesis gas 5 subsequently being subjected in 6 to a shift reaction during which the carbon monoxide reacts with water (represented but not referenced) in order to be—in part—converted into $H_2$ and $CO_2$, thus making it possible to improve the production of hydrogen. The reaction involved ($CO + H_2O \rightarrow CO_2 + H_2$) is known as the shift reaction. The reaction is generally carried out at high temperature in an HT shift (high-temperature shift) reactor. The synthesis gas 7 obtained—enriched in $H_2$ and in $CO_2$—is cooled in 8 and then the cooled gas 9 is dried in 10 in order to remove the water molecules and to thus obtain a dry gas mixture 11, which is subjected to a step of separation in a unit 12 for pressure swing adsorption (or PSA $H_2$), thus making it possible to obtain a high-pressure stream 13, enriched in hydrogen to a purity at least equal to 98%, and a low-pressure waste gas 14, comprising carbon dioxide and also the other gases present in the synthesis gas: CO, $CH_4$, $N_2$ and impurities, and also the hydrogen not extracted in the PSA $H_2$.

The stream 14 is subsequently treated in order to capture the $CO_2$ therefrom; for this, it is compressed (not represented) so that its pressure is between 20 and 100 bar and then is subjected to one or more successive steps of condensation/separation in the CPU unit 20 in order to obtain a liquid stream 21 enriched in $CO_2$ and a gas stream (capture waste product Rc) enriched in hydrogen and in other noncondensable constituents, in particular in carbon monoxide.

The gas stream 22 is subsequently subjected (after heating—not represented—up to a temperature of between 190 and 250° C.) to a shift reaction in 23 in a shift reactor operating at low temperature (low-temperature shift or LT shift) in the presence of water (the addition of steam is represented but not referenced). This passage of the capture waste product through the shift reactor thus makes it possible to convert the greater part of the CO present in it into $CO_2$, in order to capture it, thus limiting the $CO_2$ content of the flue gases. The shifted gas 24 comprises a mixture of hydrogen, carbon dioxide, methane and nitrogen, with traces of carbon monoxide; it is dried in 25 to produce a dry shifted gas 26, which is subsequently introduced into a separation unit 27. According to the process of FIG. 1, this separation unit is a unit for separation by pressure swing adsorption via a PSA $CO_2$, which produces a stream 29 enriched in $CO_2$ and a stream 28, a PSA $CO_2$ waste stream, very predominantly comprising hydrogen, a large amount of methane, and also carbon dioxide, carbon monoxide and nitrogen as minor constituents. The stream 29 rich in $CO_2$ is sent to the unit for the capture of $CO_2$ to be treated therein and the stream 28 is sent as clean fuel (generating little $CO_2$ in the flue gases) to the reforming unit 2.

Figure 2:
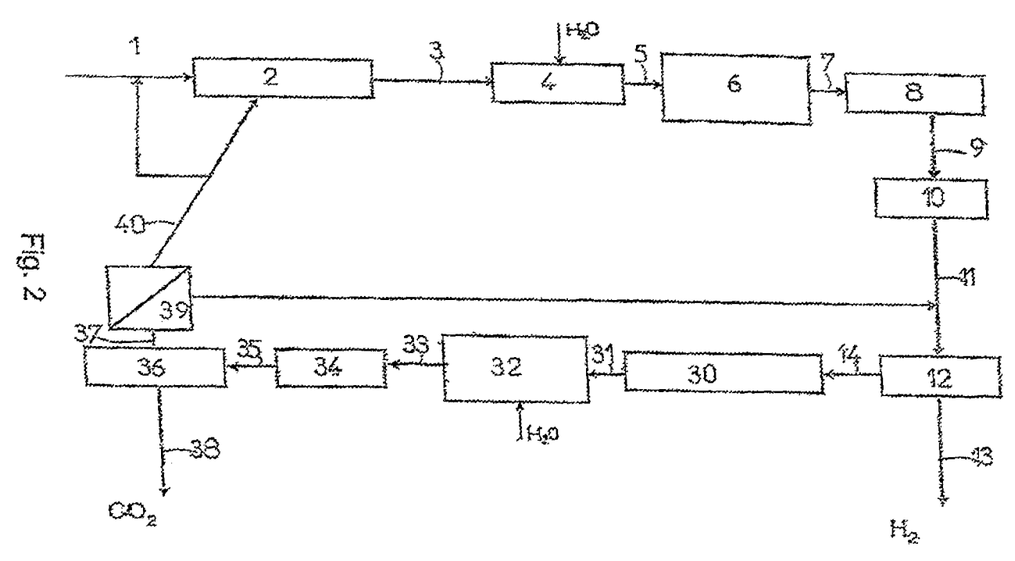
FIG. 2 is a diagrammatic view of a process for the production of hydrogen in combination with capture of carbon dioxide according to the invention, in which the (second) shift step according to the invention is placed downstream of the separation of hydrogen by PSA and upstream of the step of separation of $CO_2$ by CPU.

FIG. 2 describes a second preferred embodiment of the process of the invention. Some elements common to the 3 embodiments of the invention carry the same reference numbers. The elements which differ carry different numbers. A first part of the process—disregarding the variations in compositions and flow rates due to the recycled streams—up to obtaining the streams 13 and 14 at the outlet of the PSA $H_2$, referenced 12, is identical in the diagrams of the three figures.

The stream 14 is subsequently compressed in 30 so that its pressure is of the order of 30 bar. The compressed gas stream 31 is subsequently subjected (after heating up to a temperature of between 190 and 250° C.) to a shift reaction in 32 in a shift reactor operating at low temperature (low-temperature shift or LT shift) in the presence of water (not referenced). This passage of the PSA waste product through the shift reactor thus makes it possible to convert the greater part of the CO present therein into $CO_2$, which will add to that already present in the stream 31. The shifted gas 33 comprises hydrogen, carbon dioxide, methane, nitrogen and traces of carbon monoxide; it is dried at 34 to produce a dry shifted gas which is subsequently subjected to one or more successive steps of condensation/separation in the CPU unit in 36 in order to obtain a liquid stream 38 enriched in $CO_2$ and a gas stream 37 enriched in hydrogen and in other noncondensable constituents. The stream 38 constitutes the $CO_2$ produced by the process and the gas stream 37 (stream of the noncondensable products or capture waste product) is enriched in hydrogen. In addition, it comprises the noncondensable constituents, in particular methane, nitrogen and unconverted carbon monoxide but also a nonzero portion of the carbon dioxide.

Depending on the requirements and needs to be satisfied, there will exist various possibilities for the use of this stream 37; specifically, after the shift step according to the invention, the noncondensable products from the $CO_2$ compression and purification unit essentially comprise $CH_4$, $N_2$, if there is some in the reformed mixture of hydrocarbons, and $H_2$.

Mention will be made, among the uses which can be envisaged, of:
the use in the reforming furnace as clean fuel; in comparison with the current solution, this gas exhibits a much lower degree of emission of $CO_2$ per unit of heat as it virtually no longer comprises $CO_2$ or CO, the intrinsic calorific value of which is virtually three times lower than that of $CH_4$,
the recycling in the mixture of hydrocarbons upstream of the reforming region. The $CH_4$ can thus be converted to hydrogen and CO. Care must be taken not to accumulate nitrogen in the system by bleeding off a portion of this gas,
the recycling upstream of the PSA $H_2$, thus making it possible to increase the production of hydrogen of the system. Care must be taken this time not to accumulate nitrogen and methane. In this case, a membrane permeation step is advantageous.

According to the diagram of FIG. 2, the stream 37 is thus treated in 39 by membrane permeation in order to obtain a stream 41 rich in hydrogen, which is recycled upstream of the PSA $H_2$, and a waste product 40 under pressure. As the nitrogen permeates only to a very small extent with the hydrogen, the recycling of the hydrogen at the inlet of the PSA does not result in an accumulation of nitrogen in the process. The waste product 40 is recycled to the reforming unit, in part as charge, supplementing the charge of hydrocarbons, and in part as fuel.

Figure 3:
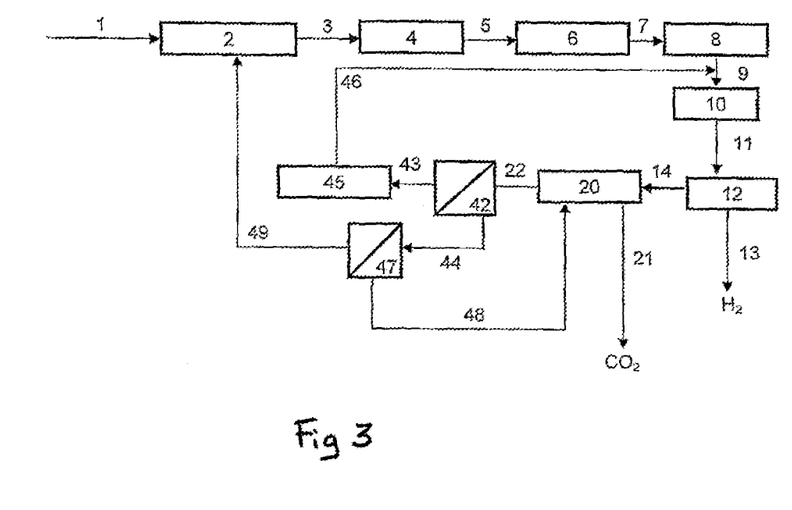
FIG. 3 is a diagrammatic view of a process for the production of hydrogen in combination with capture of carbon dioxide according to the invention, in which the (second) shift step according to the invention is carried out on the permeate from the membrane permeation of the waste product resulting from the step of separation of $CO_2$ by CPU.

FIG. 3 describes a third preferred embodiment of the process of the invention. A certain number of elements common to the 3 embodiments of the invention carry the same reference numbers. The elements which differ carry different numbers. The first part of the process—disregarding the variations in compositions and flow rates due to the recycled streams—up to obtaining the streams 22 and 21 at the outlet of the CPU unit, referenced 20, is identical in the diagrams of FIGS. 1 and 3.

The stream 22 is subsequently treated in a membrane permeation module in 42 in order to obtain a stream 43 rich in hydrogen, CO and $CO_2$ and a waste product 44 under pressure. The stream enriched in hydrogen, CO and $CO_2$ 43 is subsequently subjected (after heating up to a temperature of between 190 and 250° C.) to a shift reaction in 45 in a shift reactor operating at low or medium temperature in the presence of water (not referenced). This passage of the permeate through the shift reactor thus makes it possible to convert the greater part of the CO present therein into $CO_2$, which is added to that already present in the stream 43. The shifted gas 46 comprises hydrogen, carbon dioxide and traces of carbon monoxide; it is recycled upstream of the drying unit 10.

The waste product 44 from the membrane permeation unit 42 is treated in 47 by membrane permeation in order to obtain a stream 48 rich in $CO_2$, which is recycled upstream of the CPU unit 20, and a waste product 49 under pressure. The waste product 49 is recycled to the reforming unit as fuel.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the production of hydrogen in combination with capture of carbon dioxide starting from a mixture of hydrocarbons, the process comprising the steps of:
    (a) reforming the mixture of hydrocarbons in a reformer in order to obtain a crude synthesis gas comprising hydrogen, carbon monoxide, carbon dioxide, methane, water vapor and impurities;
    (b) cooling the crude synthesis gas with recovery of the available heat;
    (c) reacting all or part of the cooled crude synthesis gas in a shift reaction thereby oxidizing most of the carbon monoxide in the presence of water to produce carbon dioxide with corresponding production of hydrogen to produce a synthesis gas enriched in $H_2$ and $CO_2$;
    (d) cooling the synthesis gas enriched in $H_2$ and $CO_2$ and separating condensed water from the synthesis gas enriched in $H_2$ and $CO_2$ to form a cooled synthesis gas;
    (e) drying the cooled synthesis gas thereby producing a dry synthesis gas;
    (f) separating the constituents of the dry synthesis gas in a pressure swing adsorption unit thereby producing a high-pressure stream enriched in hydrogen and a waste gas stream predominantly comprising carbon dioxide and hydrogen but also comprising carbon monoxide, methane and impurities;
    (g) compressing said waste gas stream such that its pressure is between 20 and 100 bar;
    (h) introducing the waste gas stream to a second shift reactor under conditions effective for a water-gas shift reaction to form a second shift stream and then drying the second shift stream to produce a first dry gas stream depleted in CO and enriched in $CO_2$ and in $H_2$ as compared to the waste gas stream;
    (i) treating the first dry gas stream in order to separate $CO_2$, thereby obtaining a stream of liquid or supercritical $CO_2$ and a gaseous capture waste product stream enriched in hydrogen and in other non-condensable constituents; and
    (j) treating the gaseous capture waste product stream in order to produce a fuel stream, wherein the fuel stream is sent to a burner of the reformer to be burned as fuel, wherein the fuel stream comprises the non-condensable constituents from the gaseous capture waste product stream from step (i).

2. The process as claimed in claim 1, further comprising the step of recycling the stream of liquid or supercritical $CO_2$ from step (i) to a point upstream the second shift reactor.

3. The process as claimed in claim 1, wherein step (j) produces a second stream rich in hydrogen.

4. The process as claimed in claim 3, further comprising the step of recycling the second stream rich in hydrogen to a point upstream the pressure swing adsorption unit of step (f).

5. The process as claimed in claim 1, wherein the treating step (j) comprises introducing the gaseous capture waste product stream to a pressure swing adsorber in order to separate hydrogen and nitrogen.

6. The process as claimed in claim 1, wherein substantially all of the $CO_2$ produced in step (h) and found in the first dry gas stream is formed by the water-gas shift reaction of step (h) and not by combustion.

7. The process as claimed in claim 1, wherein the stream to be recycled as fuel in step (j) comprises clean fuel, wherein the clean fuel exhibits a lower degree of emission of $CO_2$ per unit of heat as compared to the gaseous capture waste.

8. The process as claimed in claim 1, wherein the carbon monoxide produced in step (a) is not converted to carbon dioxide via combustion.

9. The process as claimed in claim 1, wherein the fuel stream of step (j) also comprises hydrogen and is enriched in hydrogen as compared to the gaseous capture waste product stream.

10. The process as claimed in claim 1, wherein step (h) is conducted at a lower temperature than step (c).

11. The process as claimed in claim 1: wherein step (c) is conducted at a temperature between 250 and 480° C., and wherein step (h) is conducted at a temperature between 200 and 300° C.

12. A process for the production of hydrogen in combination with capture of carbon dioxide starting from a mixture of hydrocarbons, the process comprising the steps of:
    (a) reforming the mixture of hydrocarbons in a reformer in order to obtain a crude synthesis gas comprising hydrogen, carbon monoxide, carbon dioxide, methane, water vapor and impurities;
    (b) cooling the crude synthesis gas with recovery of the available heat;
    (c) reacting all or part of the cooled crude synthesis gas in a shift reaction thereby oxidizing most of the carbon monoxide in the presence of water to produce carbon dioxide with corresponding production of hydrogen to produce a synthesis gas enriched in $H_2$ and $CO_2$;
    (d) cooling the synthesis gas enriched in $H_2$ and $CO_2$ and separating condensed water from the synthesis gas enriched in $H_2$ and $CO_2$ to form a cooled synthesis gas;
    (e) drying the cooled synthesis gas thereby producing a dry synthesis gas;
    (f) separating the constituents of the dry synthesis gas in a pressure swing adsorption unit thereby producing a high-pressure stream enriched in hydrogen and a waste gas stream predominantly comprising carbon dioxide and hydrogen but also comprising carbon monoxide, methane and impurities;
    (g) compressing said waste gas stream in a compression and purification unit (CPU) such that its pressure is between 20 and 100 bar to produce a liquid rich in carbon dioxide and a gaseous waste product comprising non-condensables of the waste gas stream;
    (h) treating the gaseous waste product in a membrane permeation module to obtain a first stream rich in hydrogen, CO and CO2, and a waste stream under pressure;
    (i) introducing the first stream from step (h) into a second shift reactor under conditions effective for a water-gas shift reaction to form a second shift stream and then drying the second shift stream to produce a first dry gas depleted in CO and enriched in $CO_2$ and in $H_2$ as compared to the first stream;
    (j) recycling the first dry gas depleted in CO to a point in the process that is upstream the pressure swing adsorption unit of step (f) and downstream the reformer of step (a);

(k) treating the waste stream under pressure from step (h) by membrane permeation to produce a stream rich in $CO_2$ and a waste product, and recycling said stream rich in $CO_2$ to the CPU of step (g); and (l) recycling the waste product from step (k) to the reformer as fuel.

13. A process for the production of hydrogen in combination with capture of carbon dioxide starting from a mixture of hydrocarbons, the process comprising the steps of:

reforming the mixture of hydrocarbons to a crude syngas comprising hydrogen, carbon monoxide, carbon dioxide, methane, water vapor and impurities;

converting a portion of the carbon monoxide to carbon dioxide via a first water gas shift reaction to produce a first shift stream;

separating a substantial amount of hydrogen from shift stream in a pressure swing adsorption (PSA) unit to produce a hydrogen enriched stream and a PSA waste stream, the PSA waste stream comprising $CO_2$, CO, $CH_4$, hydrogen, and impurities;

removing a substantial amount of $CO_2$ from the PSA waste stream using a compression and purification unit (CPU) to produce a liquid $CO_2$ stream and a gaseous waste product;

converting a substantial amount of the carbon monoxide within the gaseous waste product to $CO_2$ in a second water-gas shift reactor to produce a second shift stream enriched in $CO_2$ and hydrogen as compared to the gaseous waste product;

removing the $CO_2$ from the gaseous waste product to produce a hydrogen stream and a $CO_2$ stream; recycling the $CO_2$ stream to the CPU; and recycling the hydrogen stream to the reformer to be used as a fuel.

* * * * *